United States Patent [19]
DeBalko

[11] Patent Number: 5,614,939
[45] Date of Patent: Mar. 25, 1997

[54] COAXIAL CABLE SERVICE INTERRUPTER

[75] Inventor: George A. DeBalko, Washington, N.J.

[73] Assignee: Lucent Technologies Inc., Murray Hill, N.J.

[21] Appl. No.: 529,302

[22] Filed: Sep. 18, 1995

[51] Int. Cl.⁶ .................................................... H04N 7/16
[52] U.S. Cl. ................................ 348/6; 348/5.5; 455/6.1
[58] Field of Search .............................. 348/6, 8, 9, 10, 348/11, 12, 13, 5.5; 455/3.1, 3.3, 4.1, 4.2, 5.1, 6.1, 6.2, 6.3; 380/7, 10, 5, 20; 358/86; H04N 7/16, 7/173, 7/167, 7/10

[56] References Cited

U.S. PATENT DOCUMENTS

| | | |
|---|---|---|
| 4,443,815 | 4/1984 | Hempell . |
| 4,543,606 | 9/1985 | Schaer ........................................ 348/5.5 |
| 4,577,221 | 3/1986 | Skinner, Sr. et al. . |
| 4,776,010 | 10/1988 | Noda et al. . |
| 5,243,647 | 9/1993 | Parikh et al. ................................ 380/4 |
| 5,331,412 | 7/1994 | Farmer et al. . |

Primary Examiner—John K. Peng
Assistant Examiner—Chris Grant
Attorney, Agent, or Firm—Lester H. Birnbaum

[57] ABSTRACT

Disclosed is a circuit and system for preventing tampering with services provided in a broadband transmission network. A coaxial relay is coupled between a cable providing signals in the network and the drop cable to the customer's premises. The coil which operates the relay is coupled to the shield conductor of the drop cable and to a source of dc potential. As long as a current flows through the shield portion and the coil, the customer is connected to the network through the relay. If current stops, as when the customer disconnects the drop cable, the customer is disconnected from the network.

5 Claims, 1 Drawing Sheet

5,614,939

COAXIAL CABLE SERVICE INTERRUPTER

BACKGROUND OF THE INVENTION

This invention relates to broadband (e.g., cable TV) transmission systems.

Typical broadband transmission systems broadcast TV signals over a coaxial cable from a head end. The signals are tapped off at a pole or pedestal near a customer's premises and a drop cable is run from the tap to the customer or to an interface device on the side of the customer's residence. Since the coaxial cable usually includes all channels, it is desirable to provide, at some point, interdiction circuitry which will scramble the channels not paid for by the subscriber. In many systems, it is desirable to provide this circuitry in the interface device. This type of system presents a problem in security since the drop cable will include all channels, and a subscriber may attempt to by-pass the interdiction circuitry in order to receive programs not paid for.

Several proposals have been made to prevent tampering by the subscriber. For example, U.S. Pat. No. 4,443,815 issued to Hempell describes a circuit which detects the interruption of a dc signal path through the center conductor of a cable coupled to the subscriber's set in the event the subscriber attempts to disconnect the cable. A switch is then operated by a relay to cut off any further signals from the drop cable. While such a scheme is effective, it would be more desirable not to rely on the center conductor of the cable for detection since added impedances on the conductor can adversely affect insertion and return losses in signal transmission. In U.S. Pat. No. 5,331,412 issued to Farmer et al., service is cut off to a subscriber by a relay in a circuit at the tap if signals added to the standard video signals are interrupted. The relay is controlled by a microprocessor which is also at the tap so that the relay opens when there is an interruption of the added signals from a tamper circuit to the tap over the drop cable. Such a system relies on the power being supplied by the customer and a conversion of the power to produce added signals. However, in some systems, power will be supplied by the provider of services.

Similar schemes with relays at the customer's premises are used for safety reasons to turn off power from the customer's premises to the tap in the event of a break in the drop cable. (See U.S. Pat. No. 4,577,221 issued to Skinner, Sr. et al. and U.S. Pat. No. 4,776,010 issued to Noda et al.)

SUMMARY OF THE INVENTION

The invention in one aspect is a circuit for preventing tampering with a coaxial drop cable having a shield conductor. The circuit includes a coaxial relay with a first input terminal and first output terminal adapted for connection between a first coaxial cable carrying signals over a broadband network and the drop cable to a customer's premises. The relay also includes a second input terminal and a second, third and fourth output terminal. Also provided is a coil for operating the relay, one end of the coil being connectable to the shield conductor of the drop cable. A switch has one terminal coupled to the other end of the coil, and another end connectable to a source of dc potential. The switch is also coupled in parallel with the second input terminal and second output terminal. The relay is coupled so that the presence of a current in the coil couples the first input and first output terminals, while the absence of a current couples the first input terminal to the third output terminal and the second input terminal to the fourth output terminal.

BRIEF DESCRIPTION OF THE INVENTION

These and other features of the invention are delineated in detail in the following description. In the drawing:

FIG. 1 is a block diagram of a portion of a system which may utilize the invention; and FIG. 2 is a schematic circuit diagram of the invention in accordance with one embodiment.

It will be appreciated that, for purposes of illustration, these figures are not necessarily drawn to scale.

DETAILED DESCRIPTION OF THE INVENTION

Figure 1:
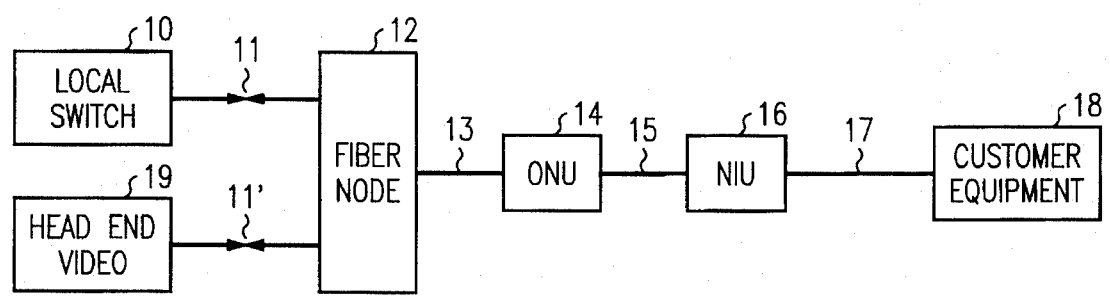

FIG. 1 illustrates one system which may employ the invention. Information in the form of voice and data originates from a local digital switch, 10, while a traditional head end, 19, provides standard cable TV signals. The head end, 19, can be separate from the local digital switch, as shown, or can be incorporated with the switch. The signals are carried over optical fibers, 11 and 11', to fiber nodes, one of which is shown as 12, where transmission is converted to coaxial cables, 13. The coaxial cables are brought to a plurality of Optical Network Units (ONUs), one of which is shown as 14. Each ONU is typically mounted on a pedestal or on a telephone pole in the vicinity of a plurality of subscribers. TV signals are tapped off the cable, 13, at the ONU, 14, and delivered by means of a drop coaxial cable, 15, to a Network Interface Unit (NIU), 16, which is typically located on the side of the subscriber's house. A coaxial jumper cable, 17, carries the signals to the customer's equipment, 18, inside the house.

In the particular system shown, the coaxial drop cable, 15, typically carries all the programs that are transmitted from the local head end, 19. In order to provide the customer with only the programs paid for, some type of interdiction equipment (19 of FIG. 2) would be included in the NIU, 16, to scramble the channels to which he or she is not entitled. This arrangement, unfortunately, may tempt the customer to by-pass the interdiction equipment in the NIU, 16, by cutting, by-passing, or otherwise tampering with the drop cable, 15.

Figure 2:
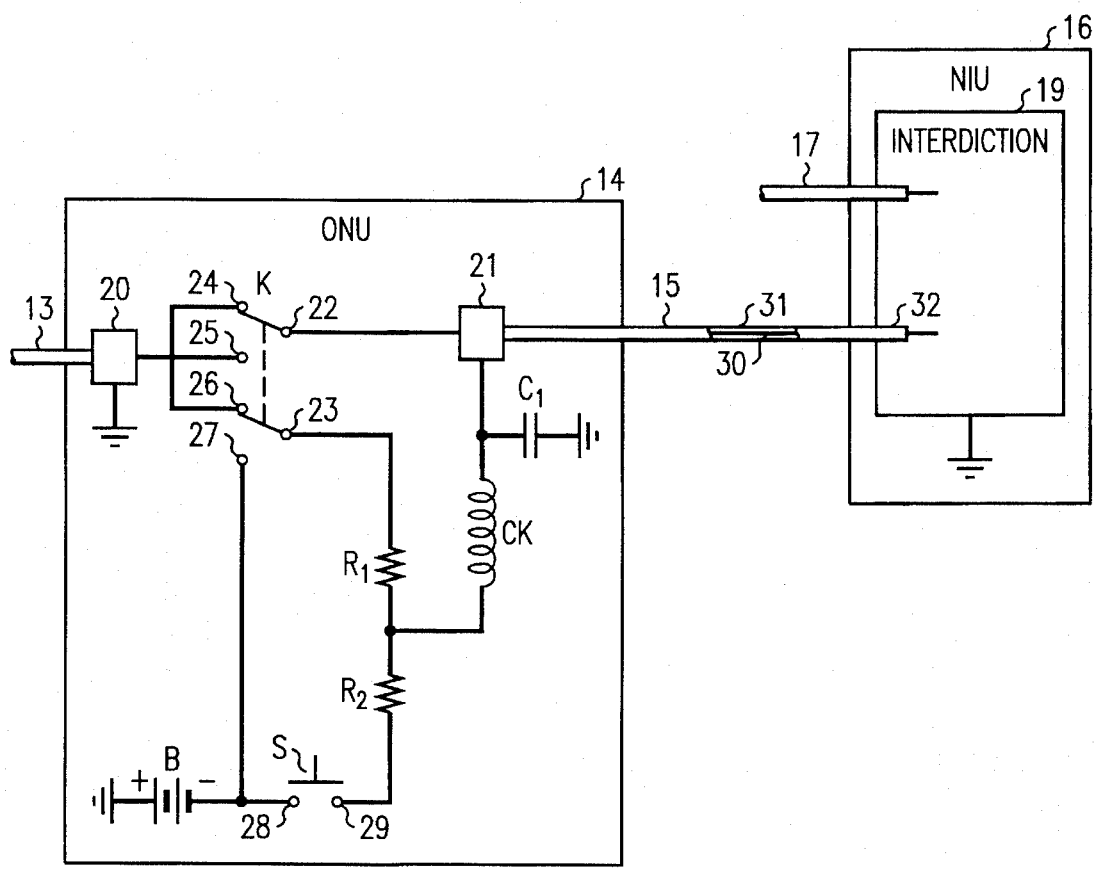

The circuit illustrated in FIG. 2 prevents tampering of the drop cable by the customer. The circuit includes a relay, K, which is electrically coupled between a first coaxial connector, 20, and a second coaxial connector, 21. The first connector, 20, is adapted to receive the coaxial cable, 13, from the network, and the second connector, 21, is adapted to receive the drop cable, 15, which is connected between the ONU, 14, and the NIU, 16. The connectors, 20 and 21, may be the standard F-type connectors. The relay, K, is a double pole relay which includes two input terminals, 22 and 23, and four output terminals, 24–27. Input terminal 22 can be switched between output terminals 24 and 25, while input terminal 23 may be switched, simultaneously with input terminal 22, between output terminals 26 and 27. Terminal 25 is coupled to the first connector, 20, while terminal 22 is coupled to the second connector, 21. Terminals 24 and 26 are electrically coupled together.

Terminal 27 of relay K is coupled to a source of dc potential, such as a battery, B. In particular, the terminal, 27, is coupled to the negative terminal of the battery and the positive terminal is coupled to ground. The terminal, 27, is also coupled to a terminal, 28, of a push-button switch, S. The other terminal, 29, of the switch, S, is coupled through resistors, $R_1$ and $R_2$, to the input terminal, 23, of the relay, K. Coupled in series with the resistor, $R_1$ or $R_2$, is a coil, CK, which operates the relay, K. One end of the coil, CK, is coupled to resistors, $R_1$ and $R_2$, and the opposite end of the coil is coupled to the shield portion of the connector, 21. The resistors, $R_1$ and $R_2$, limit the current in the circuit to a low value, typically 15 mA. Thus, if the battery, B, provides 48 volts, for example, each resistor would be approximately 1,000 ohms. One plate of a capacitor, $C_1$, is also coupled to the shield portion of the connector, 21, and the other plate of the capacitor is coupled to ground. This capacitor provides a return path for the RF signals to ground at the ONU.

It will be noted that the drop cable, 15, is of the standard type which includes a center signal conductor, 30, surrounded by a shield conductor, 31. The center conductor is coupled to the signal portion of the connector, 21, which is, in turn, coupled to the input terminal, 22, of the relay, K. The shield conductor, 31, is coupled to the shield portion of the connector, 21, which is, in turn, coupled to the relay coil, CK. The drop cable, 15, terminates at the interdiction circuit, 19, in the NIU, 16, by means of a connector, 32. The connection of the drop cable to the interdiction circuit is such that the shield conductor, 31, is connected to ground potential at the NIU, 16.

In the absence of any current through the coil, CK, the relay, K, is in the position shown so that there is no connection between the cable, 13, and the drop cable, 15. In order to initiate service, the craftsperson depresses the button which closes switch S. This can also be done remotely by electronics which can be coupled to terminals 28 and 29. Assuming that the connector, 32, is properly connected to ground, the closing of switch S will cause a small current (typically 15 mA) to flow through the shield conductor, 31, of the drop cable, 15, and through the coil, CK, due to the connection of the battery, B. The current is sufficient to operate the relay, K, so that connection of terminals 22 and 23 is switched to terminals 25 and 27, respectively. This action connects the customer to the cable, 13, and also causes at least some of the current through coil, CK, to by-pass the switch, S, through resistor $R_1$. Thus, after switch S is opened, sufficient current will continue to flow through the coil, CK, to hold the relay, K, in the position to provide service to the customer.

The customer will continue to receive service as long as the drop cable is grounded at the NIU. However, should the customer attempt to disconnect the drop cable, 15, from the interdiction circuit, 19, the ground connection would be removed and the resulting open circuit in the shield conductor, 31, will cause current to stop flowing through the coil, CK. With no current flowing through coil CK, the relay, K, will return to its quiescent state shown in FIG. 2, and service to the customer will be cut off. Reconnecting the drop cable, 15, will not restore service since switch S is open and current still cannot flow through coil CK. The customer is, therefore, forced to notify the provider who can verify any evidence of tampering. Only when a craftsperson closes the switch, S, by depressing the button, will service resume in accordance with the above-described process. Thus, the provider of service has a convenient means of determining attempts at tampering with the drop cable without interfering with any signals transmitted through the signal conductor, 30, during normal service. Further, the tamper control circuit allows the shield to be grounded as per National Electrical Code and Underwriter Laboratories requirements at the point of entry (NIU) at the house.

The invention claimed is:

1. A circuit for preventing tampering with a coaxial drop cable having a shield conductor, the circuit comprising:

a coaxial relay comprising a first input terminal and first output terminal connectable between a first coaxial cable carrying signals over a broadband network and the drop cable, the relay also including a second input terminal and a second, third and fourth output terminal;

a coil for operating the relay, the coil having one end connectable to the shield conductor of the drop cable; and a switch having one terminal coupled to the other end of the coil and another terminal connectable to a source of dc potential, the switch also being coupled in parallel with the second input terminal and the second output terminal of the relay, the relay being coupled so that the presence of a current in the coil couples the first input and output terminals and the second input and output terminals, while the absence of a current couples the first input terminal to the third output terminal and the second input terminal to the fourth output terminal.

2. The circuit according to claim 1 wherein the switch is coupled to the coil through a first resistor and is coupled to the second input terminal through the first resistor and a second resistor.

3. The circuit according to claim 1 further comprising a capacitor having one plate coupled to the one end of the coil and another plate coupled to ground potential.

4. The circuit according to claim 1 wherein the first input terminal and the first output terminal are coupled to signal portions of respective coaxial connectors, and the said one end of the coil is connected to a shield portion of the connector coupled to the first input terminal.

5. A system for preventing tampering with service in a broadband transmission network comprising:

interdiction circuitry having a ground connection;

a coaxial drop cable having a signal conductor and a shield conductor and having one end of the shield conductor coupled to the ground connection of the interdiction circuitry;

a coaxial relay comprising a first input terminal coupled to the signal conductor of the drop cable and a first output terminal coupled to a coaxial cable in the transmission network, the relay also including a second input terminal and second, third and fourth output terminals;

a coil for operating the relay, the coil having one end connected to the shield conductor of the drop cable; and a switch having one terminal coupled to the other end of the coil and another terminal connectable to a source of dc potential, the switch also being coupled in parallel with the second input terminal and the second output terminal of the relay, the relay being coupled so that the presence of a current in the coil couples the first input and output terminals and the second input and output terminals, while the absence of a current couples the first input terminal to the third output terminal and the second input terminal to the fourth output terminal.

* * * * *